Figure 1:
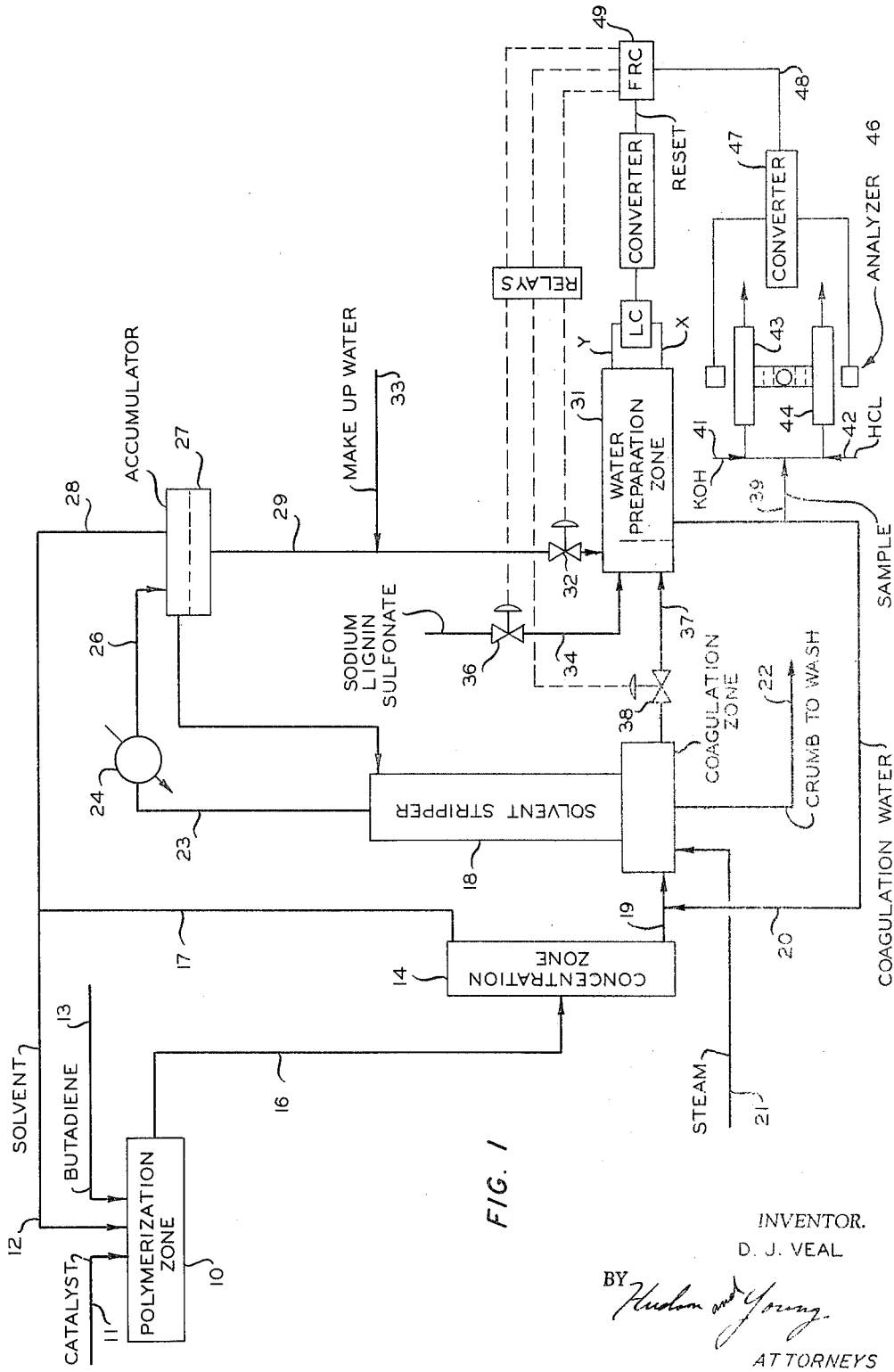

INVENTOR.
D. J. VEAL
BY Hudson and Young
ATTORNEYS

United States Patent Office 3,247,176
Patented Apr. 19, 1966

3,247,176
CONTROL OF DISPERSING AGENT IN
RUBBER RECOVERY
Dean J. Veal, Bartlesville, Okla., assignor to Phillips
Petroleum Company, a corporation of Delaware
Filed June 26, 1961, Ser. No. 119,666
8 Claims. (Cl. 260—94.7)

The present invention relates to a method of controlling a dispersing agent in a rubber recovery operation.

In recent years a great deal of work has been done in the development of new types of polymeric materials, primarily rubbery materials, wherein the polymer is produced in the presence of organometal initiators. The products of such polymerization processes are recovered from the polymerization zone as a solution in a hydrocarbon solvent. Of the various recovery processes suggested, steam stripping appears to have a commercial advantage. When steam stripping is used, it is necessary to utilize a dispersing agent to prevent agglomeration of the rubbery particles. Alkali metal lignin sulfonates have been found to be efficient and effective dispersants for the process. However, during the coagulation step, a considerable portion of the dispersing agent is removed with the rubber product. This makes it difficult to maintain a desired concentration in the coagulating vessel under continuous operations. In such operations, the amount of sulfonate used is in the range of 0.01 to 1 pound per 100 pounds of the rubbery polymer. The amount in the water is generally in the range of 30 to 500 p.p.m.

The object of this invention is to provide a system for continuously and automatically controlling the amount of alkali metal lignin sulfonate in the stripping water.

The present invention is based on the discovery that a sample of coagulating water having a concentration in the range of 0 to 300 p.p.m. of the sulfonate can be analyzed by a differential ultraviolet absorption method. In this method, a sample of this coagulating water is divided into two equal portions, one of which is made basic and the other half of which is made acidic. Any strong acid can be used. These include the inorganic acids such as sulfuric acid and hydrochloric acid. Organic acids such as acetic acid are also suitable. I prefer to use hydrochloric acid. To make the other portion of the sample basic, I use sodium or potassium hydroxide. When the samples are passed at equal rates through two ultraviolet absorption cells which are being radiated by monochromatic light having a wave length of 353 millimicrons, the difference between the absorption of light by the two cells is proportional to the concentration of the sulfonate in the original sample. The light transmitted by each cell impinges on a photo-electric device and the resulting electrical signals are passed through a suitable network to provide a signal which is proportional to the concentration of the sulfonate and which can activate relays which, in turn, operate solenoid valves in the lines supplying the coagulating water mixing vessel.

Accompanying and forming a part of this disclosure is a drawing showing, in diagrammatic form, apparatus suitable for practicing my invention, the drawing including certain electrical diagrams showing, in detail, elements of the automatic electrical system.

Figure 2:
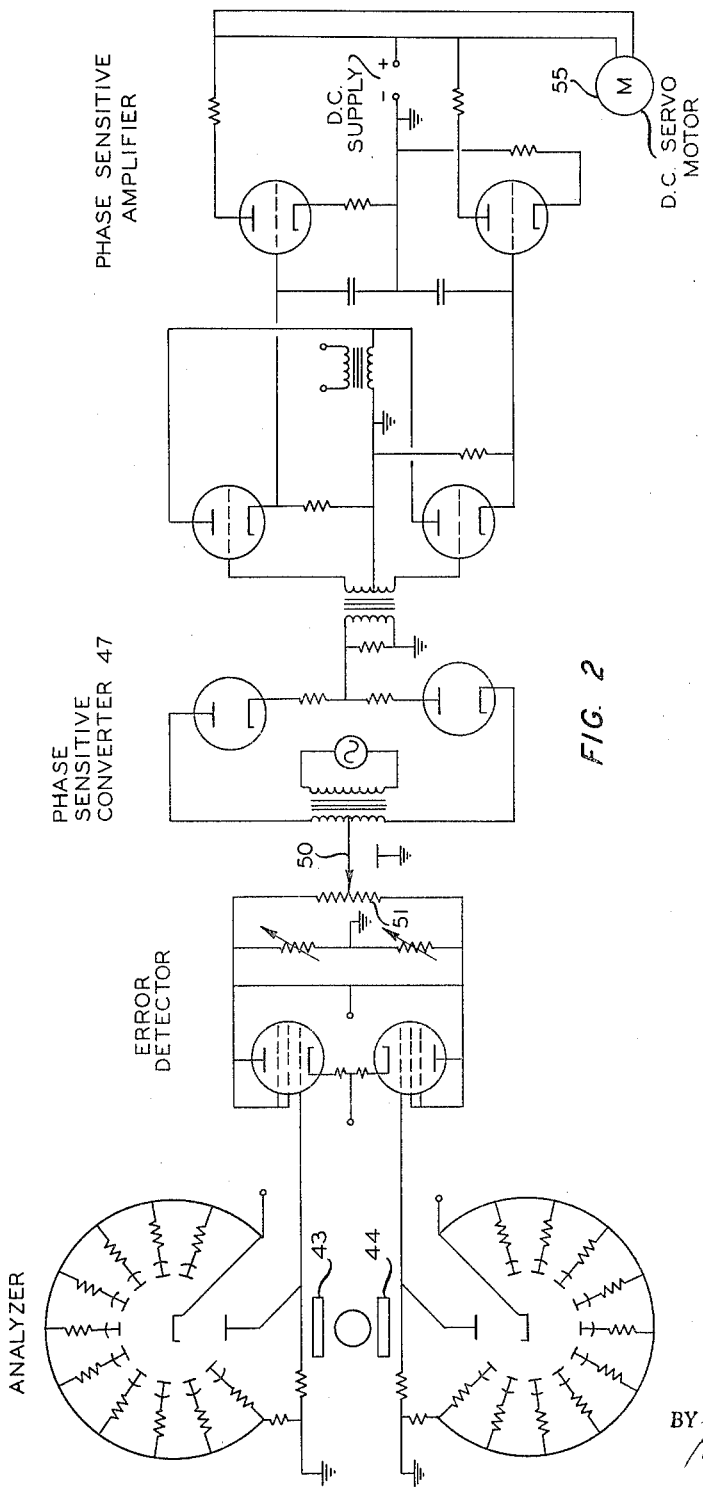
Figure 3:
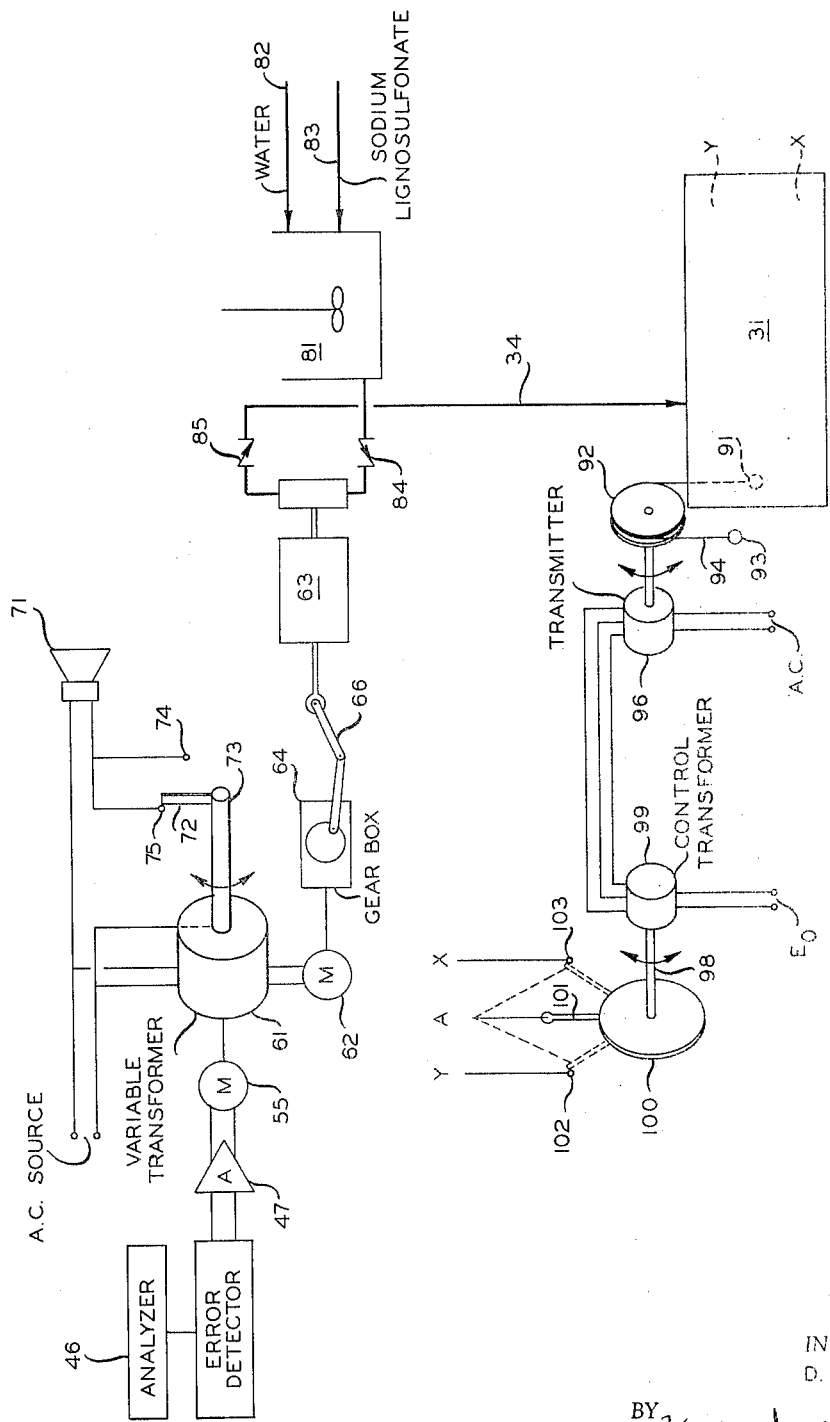
Figure 4:
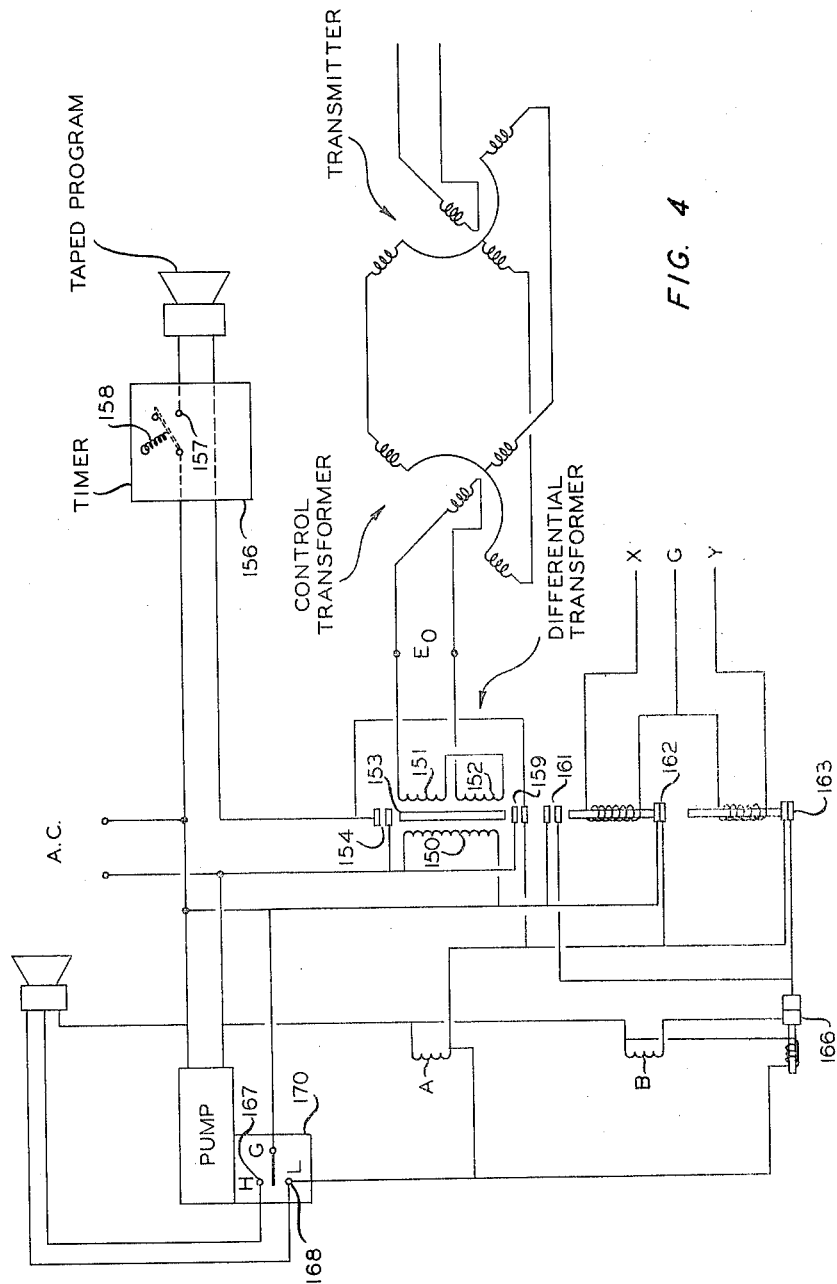
Figure 5:
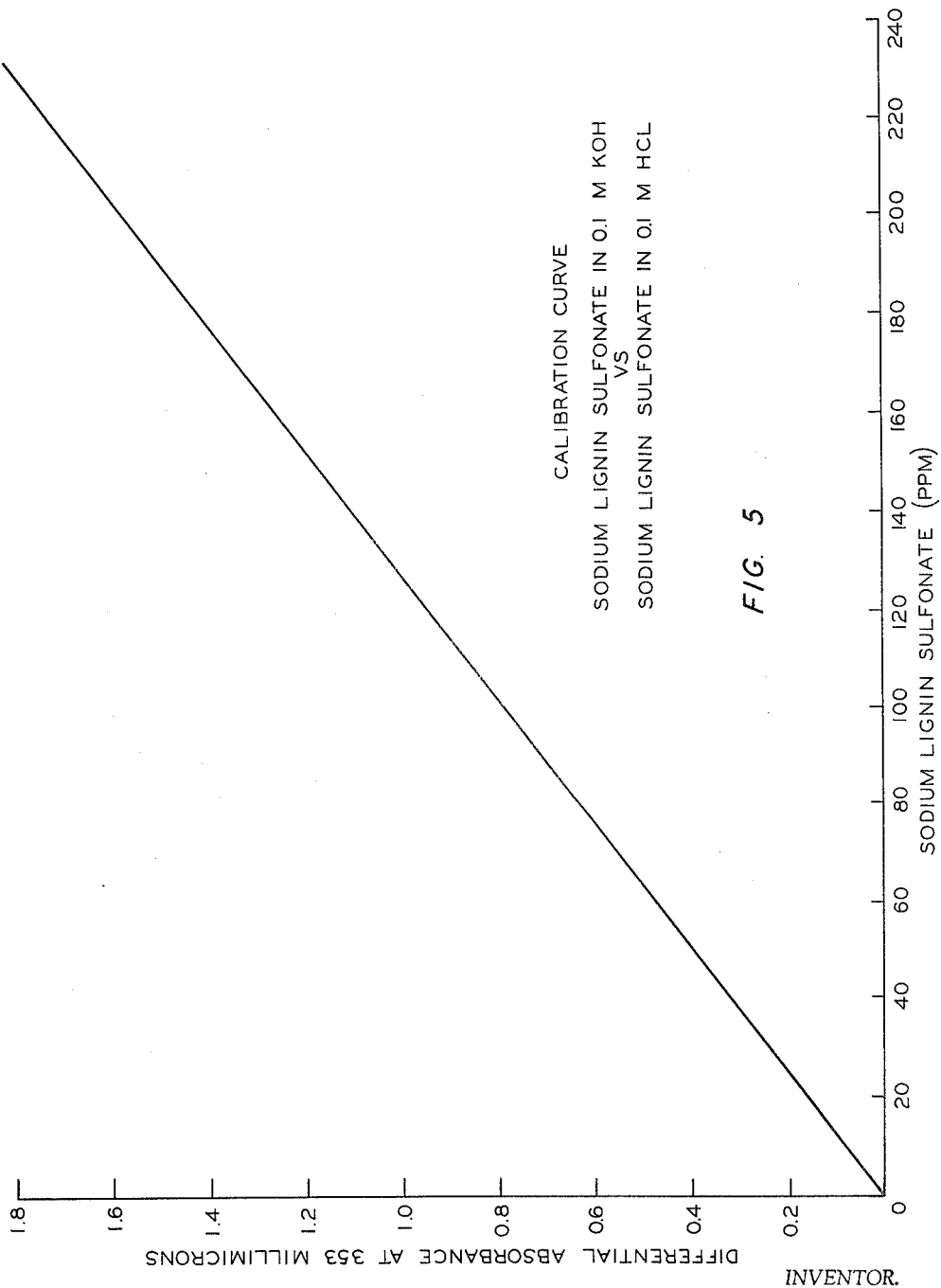

FIGURE 1 is a complete diagram showing the polymerization zone, concentration apparatus, the stripping zone, and the water preparation zone which includes an analyzer and associated equipment for controlling addition of water and alkali metal lignin sulfonate. FIGURE 2 is a schematic drawing of the electrical and electronic components suitable for converting the difference in ultraviolet absorbance between the acidic and basic solutions of samples from the coagulation water stream to degrees rotation of a D.C. servometer. FIGURE 3 shows, in schematic form, the apparatus for feeding the dispersing agent operated in response to the output of the analyzer. This figure also shows the liquid level control system used to maintain a desired supply of the coagulating solution for feed to a steam stripping step. FIGURE 4 shows the wiring diagram for the control system and apparatus shown in FIGURE 3. FIGURE 5 is a curve showing the relationship between parts per million of sodium lignin sulfonate plotted against differential absorbance of the material in 0.1 molar potassium hydroxide and 0.1 molar hydrochloric acid.

For the coagulation process, the lithium, sodium, potassium, rubidium, and cesium lignin sulfonates can be used. The sodium and potassium lignin sulfonates are preferred. Sodium lignin sulfonate is presently commercially available, a process for its production being given in Industrial and Engineering Chemistry 50, No. 4, 570–576 (1958). Also described in this article are the partially desulfonated lignin sulfonates which can also be used. The alkali metal lignin sulfonate is employed in the aqueous phase in an amount to give good crumb formation. Usual amounts range from 0.01 to 1 pound per 100 pounds of rubber charged to the process.

In this system, it is possible to recover rubber crumb from various types of rubber in solution. These rubbery polymers are prepared by polymerizing a monomer system containing a single monomer or a mixture containing at least a major portion of conjugated dienes containing 4 to 8 carbon atoms. Examples of conjugated dienes which can be used include 1,3-butadiene, isoprene, 2,3-dimethylbutadiene, 2-methoxybutadiene, 1,3-hexadiene, and 1,3-octadiene. These conjugated dienes can be polymerized either alone or in admixture with each other and/or with one or more other compounds containing an active $CH_2=C<$ group which are copolymerizable therewith. Suitable comonomers containing this group include styrene, acrylonitrile, methyl acrylate, methyl methacrylate, vinyl chloride, methyl vinyl ether, ethylene, propylene, 1-butene, 1-propene, 1-octene and the like. An important group of polymers are those with substantially all one type of structure such as cis-polybutadiene, trans-polybutadiene, cis-polyisoprene and trans-polyisoprene. However, polymers containing substantial amounts of two or more types of configuration, such as polybutadiene formed by approximately equal amounts of cis and trans 1,4-addition, can be treated according to this invention.

The polymers are prepared in the presence of organic solvents including paraffins, cycloparaffins and aromatic hydrocarbons which are relatively inert, non-deleterious to the catalyst and liquid under the conditions of the process. Examples include the paraffin hydrocarbons such as propane, butane, pentane, isooctane; cycloparaffins, such as cyclohexane, methylcyclohexane; and aromatic compounds, such as benzene, toluene, and the like. The solvent is one which is normally liquid, which will dissolve the polymer, and which can be vaporized in the presence of steam or hot water.

A large number of initiator systems are suitable for the production of the polymers.

One type of initiator system is a two or more component catalyst wherein one component is an organometal compound, including those where one or more organo groups is replaced by a halogen; a metal hydride; or a metal of Group I, II or III; and the second component is a Group IV to VI compound, e.g., salt or alcoholate. This type of initiator system is fully described with a group of examples in columns 5 through 8 of Patent 2,886,561 dated May 12, 1959.

Another initiator system which is suitable involves the use of a compound of the formula $R(Li)_x$, wherein R is a hydrocarbon radical selected from the group consisting of aliphatic, cycloaliphatic and aromatic radicals and combinations of these radicals and $x$ is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2 - dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8 - tetralithiodecane, 1,5,10,20-tetralithioeicosane, 1,2,4,6-tetralithiocyclohexane, 1,2,3,5-tetralithio-4-hexylanthracene, 1,3 - dilithio-4-cyclohexene, and the like.

The amount of organolithium initiator employed can vary over a broad range. In general, the amount of initiator used will be in the range from 0.3 to 100 milliequivalents of lithium per 100 parts by weight of total monomers charged and will preferably be in the range from 0.6 to 15 milliequivalents of lithium per 100 parts by weight of total monomers charged. When n-butyllithium is employed as the initiator for the production of an easily processable 40 to 60 Mooney rubber (ML–4 at 212° F.), the quantity of initiator required will generally be in the range from 2 to 2.4 millimoles per 100 parts of total monomers charged.

Still another initiator system utilizes a cobalt compound and an alkyl metal or alkyl metal halide wherein one but not all of the alkyl groups can be replaced by halogen. The Group III metals, as exemplified by aluminum, are used to provide the metal alkyl component. Examples of these organometal compounds include trialkylaluminums, such as triethylaluminum and triisobutylaluminum and alkyl aluminum halides, such as ethylaluminum dichloride and diethylaluminum chloride. For the cobalt compound, the cobaltous form is preferred. Examples of these compounds include cobaltous chloride, cobaltous sulfate, cobaltous nitrate, and the salts of organic acids, such as cobaltous acetate.

Some of the systems included within the above description have been found particularly suitable for the production of polymers having particular molecular configuration. For instance, polybutadiene having 85 to 100 percent of the polymer formed by cis 1,4-addition can be prepared using initiator systems comprising triisobutylaluminum and titanium tetraiodide; triisobutylaluminum, titanium tetrachloride, and iodine; and triisobutylaluminum, titanium tetraiodide, and titanium tetrachloride. Polybutadiene having 70 to 100 percent of the polymer formed by trans-1,4-addition can be prepared using an initiator system comprising lithium aluminum hydride and titanium tetraiodide. The catalyst system comprising lithium aluminum hydride and titanium tetrachloride produces a polybutadiene having a major amount of the polymer formed by 1,2-addition. Similar products are obtained using isoprene except that a portion of the product can be formed by 3,4-addition.

To determine the amount of the addition of the various types, the polymers can be dissolved in carbon disulfite to form a solution having 20 grams of polymer per liter of solution. The infrared spectrum of such a solution (percent transmission) is then determined in a commercial infrared spectrometer.

The percent of the total unsaturation present as trans 1,4- is calculated according to the following equation and consistent units: $\epsilon = E/tc$ where:

$\epsilon$ = extinction coefficient (liters-mols$^{-1}$-microns$^{-1}$);
$E$ = extinction (log $Io/I$);
$t$ = path length (microns);
and
$c$ = concentration (mols double bond/liter).

The extinction is determined at the 10.35 micron band and the extinction coefficient used is $1.21 \times 10^{-2}$ (liters-mols$^{-1}$-microns$^{-1}$).

The percent of the total unsaturation present at 1,2- (or vinyl) is calculated according to the above equation, using the 11.0 micron band and an extinction coefficient of $1.52 \times 10^{-2}$ (liters-mols$^{-1}$-microns$^{-1}$).

The percent of the total unsaturation present as cis 1,4- is obtained by subtracting the trans 1,4- and 1,2- (vinyl) determined according to the above methods from the theoretical unsaturation assuming one double bond per each $C_4$ unit in the polymer.

For treatment, it is preferred that the concentration of the polymer in the solvent be in the range of 5 to 15 percent rubber by weight. However, the broader range of 1 to 25 percent rubber is applicable, the higher concentration resulting in greater difficulty in mixing the rubber solution with the water. If effective mixing systems are available, it is quite possible to work with solutions containing more than 15 percent rubber.

Probably my invention can be best understood by reference to the drawing. In FIGURE 1, there is provided a polymerization zone 10, this zone being supplied with catalyst by conduit 11, solvent by conduit 12, and the monomer by conduit 13. The effluent from this zone, normally containing about 5 percent polymer by weight, is passed to concentration zone 14 by means of conduit 16. This concentration zone 14 is provided to increase the concentration of polymer in the solvent to a value usually in the range of 10 to 15 percent. While the solution can be directly contacted with steam, indirect heat exchange is preferred for this step in the concentration. The solvent is removed overhead through conduit 17 which communicates with conduit 12 for return of the solvent polymerization zone 10. The concentrated rubbery solution is passed to solvent stripper 18 by means of conduit 19. Coagulation water is added to the rubber solution in conduit 19 by means of conduit 20, this coagulation water being supplied as thereinafter set forth. Steam is supplied to the concentration zone to strip the solvent from the rubber solution and to cause the rubber to coagulate. Steam is supplied to stripper 18 by means of conduit 21. Rubber crumb is removed from the lower portion of stripper 18 by conduit 22. The overhead from stripper 18, a mixture of solvent and water, is removed by conduit 23, condensed in condenser 24, and passed by conduit 26 to accumulator 27. A phase separation is made in accumulator 27, the solvent going overhead by means of conduit 28 and the water removed by conduit 29. Obviously, where water will cause difficulty in the polymerization, some means of treatment is necessary for the solvent removed overhead but this is not shown because it is not a part of the present invention. The water from accumulator 27 is passed to water preparation zone 31, conduit 29 having valve 32 therein. Makeup water is supplied by conduit 33 as necessary. The lignin sulfonate is fed to water preparation zone 31 by means of conduit 34, the latter conduit having valve 36 therein. A portion of the water collected in the lower end portion of stripper 18 is passed directly to water preparation zone 31 by means of conduit 37 having valve 38 therein.

It is this water in water preparation zone 31 which is subsequently mixed with the polymer solution in line 19 and fed to stripper 18. As previously pointed out, this water should contain a certain amount of the sulfonate so that good rubber crumb is produced. Since the sulfonate is removed by the rubber, it is necessary to determine continuously the amount of sulfonate in the water and to add additional sulfonate to replace that which is removed with the rubber.

To perform this analysis, a small amount of the water in line 20 is removed by conduit 39. This stream is split into two halves, potassium hydroxide or equivalent being added to the first portion by means of conduit 41 and hydrochloric acid or equivalent being added to the second by means of conduit 42. These portions, made respectively basic and acidic, are passed into sample cells 43 and 44 wherein they are exposed to monochromatic light of a wave length of 353 millimicrons. The amount of light transmitted by the fluid in each of these cells is measured by analyzer 46 and results in electrical signals whose difference is proportional to the instantaneous concentration of sulfonate in line 20 at the time of sampling. This signal is fed to converter 47 for conversion to amplified mechanical energy. The output of converter 47 is passed by line 48 to a flow recorder controller 49.

The analyzer used to provide the output is illustrated more specifically and completely in FIGURE 2 to which attention is now directed. Omitted from FIGURE 2, to simplify the drawing, are the 1000 volt D.C. power supply for the photomultiplier tubes, the plate supply source comprising the rectifier and transformer, and the 6.3 volt A.C. power supply for the tube filaments which is tapped from the plate supply transformer. Such components are standard and are believed to be unnecessary in this drawing. The output of each side of the analyzer is proportional to the amount of light from the source transmitted by the liquid in each of the test cells. This output is fed to the error detector which is a bridge normally set to balance the amplified signals from two photomultiplier tubes at a desired concentration and to generate a D.C. signal through slider 50 on resistance 51 when the concentration varies from the desired concentration. The signal is positive for high concentrations, negative for low concentrations, and zero for the preset concentration. This D.C. signal is fed to the phase sensitive converter 47 which produces A.C. signal output which is in phase with the A.C. supply when no D.C. signal is received, that is when the concentration is at the desired level. This signal is amplified by the phase sensitive amplifier which is, in turn, connected to a D.C. servomotor 55. When the concentration is higher than desired, the A.C. voltage signal from the phase sensitive converter lags the A.C. supply causing D.C. servomotor 55 to rotate in one direction. In the particular system shown this rotation is to the left. Similarly, when the concentration is lower than desired, the A.C. voltage from the converter leads the A.C. supply which causes the D.C. servomotor 55 to rotate in the other direction in this case to the right.

This function will be more aparent from FIGURE 3. In this figure, the servomotor 55 is connected to the shaft of a variable A.C. transformer 61, this transformer supplying power for the variable speed motor 62 of the pump 63. To reduce the speed of the motor, the gear box 64 is connected through a series of lever arms 66 to this pump 63. By this action, the pump is slowed when the concentration is higher than that desired and hastened when the concentration is below that determined from the set point. The pump piston diameter and stroke length are variable to provide the desired flow of concentrated alkali metal lignin sulfonate to replace the amount used in the process.

An audible alarm 71 is also provided. This alarm is actuated by a rotating contact 72 attached to the shaft 73 of the variable A.C. transformer. On the closing of contact 74 or 75, at either limit of the concentration, the audible alarm is sounded which will warn operator that the system is out of control.

Tank 81 is provided for the production of a concentrated solution of the alkali metal lignin sulfonate, this tank being supplied with water through conduit 82 and the sulfonate by conduit 83. This concentrated solution is passed from tank 81 through check valves 84 and 85 and conduit 34 to the water preparation zone 31.

I have also provided a liquid level control system for water preparation zone 31. This system is also best shown in FIGURE 3. The level of water in preparation zone 31 is normally controlled between the liquid levels indicated at X and Y. A float 91 is located in tank 31, this being suspended on chain 94 on pulley 92 and provided with a counterweight 93. A synchro transmitter 96 is connected to the pulley shaft 97 so that its rotor coil turns with pulley 92. At a liquid level between X and Y, the transmitter rotor is set in a position at right angles to the rotor of control transformer 99. As the liquid level rises or falls, the rotor position of the control transformer 99 follows rotor of transmitter 96 to maintain the 90° relationship. A wheel 100 mounted on rotor shaft 98 of the control transformer 99 also rotates in response to the transmitter 96. A pin 101, radially oriented with respect to the wheel 100 engages a knob 102 when the level Y has been reached. A second knob 103 is mounted in the opposite direction so that the pin 101 engages it when the level X has been reached.

The wiring control for the liquid level controller is shown schematically in FIGURE 4 and operates as follows. When the level falls below X, the rotor of the control transformer can no longer follow the rotor of the transmitter 96 in the low direction and a signal $E_o$, shown in FIGURE 4, is transmitted which is out of phase with the supply voltage by an angle proportional to the departure from 90° in the angle between the rotors in the transmitter and control transformer. Should the level rise above Y, the pin 101 will lodge on the Y knob and the signal $E_o$ generated as the level rises will be in phase with the A.C. source and proportional to the departure from 90° of the angle between the rotors in the transmitter and control transformer. The signal $E_o$ is fed to a differential transformer comprising a primary coil 150, two series opposing secondary coils 151 and 152, and a free-moving rod-shaped magnetic core 153. When $E_o$ is zero, indicating a liquid level between X and Y, the action of the transformer is to maintain core 153 in centric or neutral position as illustrated. When $E_o$ is in phase, indicating that a level above Y exists, the magnetic core 153 is thrust upward to balance the transformer. When $E_o$ is out of phase with the primary source indicating that a level below X exists, the core 153 is thrust downward to balance the transformer. When the core moves upward, it closes the mercury switch 154 which activates the timer 156. If the timer reaches terminal 157, a switch is closed which starts a tape program of alarm which continues until the operator resets the timer. If the level falls below Y before the timed interval is completed, switch 154 opens and the timer is returned to the open position by means of spring 158.

When a level below X is reached, core 153 moves downward to close mercury switch 159 and again the timer is activated and responds in the same manner as for high levels.

When the level falls below X, relay 161 closes, switch 162 is opened and switch 163 remains closed. This action opens valves 32 and 38. When the level is between X and Y and the concentration is within the desired range, relays 154, 159, and 162 are opened and relays 163, 161 and 166 are closed. This action closes valve 32 and valve 38 remains open.

When the liquid is between X and Y and the concentration increases above the upper limit, contact 167 in the pump control system 170 closes. This action opens valve 32, opens relay 166 which closes valve 38 and an alarm is actuated to warn the operator that the concentration is too high. At any time that the concentration falls below the minimum desired, the contact 168 closes to sound an alarm. Thus liquid level and concentration are utilized to give commands, the execution of which tends to return the system to control.

*Example*

The following example will illustrate my invention as it is applied to a particular polymerization system. Butadiene was polymerized in a toluene and butyllithium diluent using a triisobutlyaluminum-titanium tetrachloride initiator in a polymerization zone to convert the butadiene to cis-polybutadiene. The product was formed 95 percent by cis-1,4 addition.

In the concentration zone, a portion of the toluene is removed to produce a solution containing 15 percent rubber solids. In the coagulation zone, the rubber is contacted with two to ten times its weight of an aqueous solution of sodium lignin sulfonate. In one run, 18,000 pounds per hour of the aqueous solution were used to treat approximately 4000 pounds per hour of the rubbery solution of 15 percent concentration. In this run, the sodium lignin sulfonate concentration in the water was in the range of 0.015 to 0.025 weight percent (150 to 250 p.p.m.). This corresponds to 2.7 to 4.5 pounds per hour of the sulfonate or, based on the rubber, 0.45 to 0.75 weight percent.

For the control of the lignin sulfonate concentration, a sample is taken from the coagulation water line and divided into two equal streams. Into one stream, aqueous potassium hydroxide solution is added to give a 0.1 molar solution. Into the other sample stream, aqueous hydrochloric acid solution is added to give a 0.1 molar solution. The basic solution passes through one of two matched ultraviolet absorption cells while the acidic solution passes through the other of the matched cells. It will be obvious that careful flow control is necessary, as well as good mixing of the samples in order that the differential ultraviolet absorption between the two solutions will be proportional to the sulfonate content of the original sample.

The sodium lignin sulfonate content of the water can be determined by the calibration curve shown herein as FIGURE 5.

A source of collimated monochromatic light having its principal intensity at 353 millimicrons originates between the cells so that each cell is subjected to a beam of equal intensity. The light transmitted through the cells actuates matched photoelectric transducers which may be in the form of photo cells or photo tubes but which must have good sensitivity and reproducibility in the 353 millimicron range of the spectrum. A Cary spectrophotometer, equipped with 1-cm. cells is satisfactory and was used in the determination of the curve of FIGURE 5.

As many possible embodiments can be made of this invention without departing from the scope thereof, it is to be understood that all matter herein set forth is to be interpreted as illustrative and not as unduly limiting the invention.

I claim:

1. In the recovery of rubber in crumb form from a solution thereof in an inert solvent by steam stripping wherein the rubber solution is introduced into a steam stripping zone containing an aqueous phase, said aqueous phase containing an alkali metal lignin sulfonate, the improvement comprising essentially the steps of removing a sample of the water, dividing said sample into first and second halves, making the first half acidic by adding a strong acid thereto, making the second half basic by adding a strong base thereto, measuring the difference in absorption of light having a wavelength of 353 millimicrons of each of said halves of said sample, and adjusting alkali metal lignin sulfonate supplied to the stripping zone in response to changes in concentration of alkali metal lignin sulfonate in the sample.

2. In the recovery of rubber in crumb form from a solution thereof in an inert solvent by steam stripping wherein the rubber solution is introduced into a stream stripping zone containing an aqueous phase, said aqueous phase containing an alkali metal lignin sulfonate, the improvement comprising essentially the steps of removing a sample of the water, dividing said sample into first and second halves, adding KOH to the first half of said sample, adding HCl to the second half of said sample, measuring the difference in absorption of light having a wavelength of 353 millimicrons of each of said halves of said sample, said difference in absorption being proportional to the concentration of alkali metal lignin sulfonate in the original sample, and adjusting alkali metal lignin sulfonate supplied to the stripping zone in response to changes in concentration of alkali metal lignin sulfonate in the sample.

3. In the recovery of cis-polybutadiene in crumb form from a solution thereof in an inert solvent by steam stripping wherein the solution is introduced into a steam stripping zone containing an aqueous phase, said aqueous phase being supplied from a water preparation zone and containing 0.1 to 1 pound of sodium lignin sulfonate per 100 pounds of polymer, the improvement comprising essentially the steps of removing a sample of the water containing sodium lignin sulfonate supplied to the stripping zone, dividing said sample into first and second halves, adding KOH to the first half of said sample, adding HCl to the second half of said sample, measuring the difference in absorption of light having a wavelength of 353 millimicrons of each of said halves of said sample, said difference in absorption being proportional to the concentration of sodium lignin sulfonate in the original sample, measuring the liquid level in said water preparation zone, and adjusting feed of water and sodium lignin sulfonate to said water preparation zone in response to changes in liquid levels in said water preparation zone and changes in concentration of sodium lignin sulfonate in said water preparation zone.

4. A method of determining the concentration of an alkali metal lignin sulfonate in an aqueous solution comprising essentially the steps of dividing at least a portion of said solution into first and second halves, making the first half acidic by adding a strong acid thereto, making the second half basic by adding a strong base thereto, and measuring the difference in absorption of light having a wavelength of 353 millimicrons of each of said halves of said sample, said difference in absorption being proportional to concentration of alkali metal lignin sulfonate in the original solution.

5. A method of determining the concentration of an alkali metal lignin sulfonate in an aqueous solution comprising essentially the steps of dividing at least a portion of said solution into first and second halves, adding KOH to the first half of said sample, adding HCl to the second half of said sample, and measuring the difference in absorption of light having a wavelength of 353 millimicrons of each of said halves of said sample, said difference in absorption being proportional to concentration of alkali metal lignin sulfonate in the original solution.

6. The process of claim 5 wherein said alkali metal lignin sulfonate is sodium lignin sulfonate.

7. A method of determining the concentration of an alkali metal lignin sulfonate in an aqueous solution comprising essentially the steps of dividing at least a portion of said solution into first and second halves, making the first half acidic by adding a strong acid thereto, making the second half basic by adding a strong base thereto, said acid and base being added in amounts sufficient to provide about 0.1 molar solutions thereof, and measuring the difference in absorption of light having a wavelength of 353 millimicrons of each of said halves of said sample, said difference in absorption being proportional to concentration of alkali metal lignin sulfonate in the original solution.

8. In the recovery of rubber in crumb form from a solution thereof in an inert solvent by steam stripping wherein the rubber solution is introduced into a steam stripping zone containing an aqueous phase, said aqueous phase containing an alkali metal lignin sulfonate, the improvement comprising essentially the steps of removing a sample of the water, dividing said sample into first and second halves, making the first half acidic by adding a strong acid thereto, making the second half basic by adding a strong base thereto, said acid and base being added in amounts sufficient to provide about 0.1 molar solutions thereof, measuring the difference in absorption of light having a wavelength of 353 millimicrons of each of said halves of said sample, and adjusting alkali metal lignin sulfonate supplied to the stripping zone in response to changes in concentration of alkali metal lignin sulfonate in the sample.

References Cited by the Examiner

UNITED STATES PATENTS

| | | | |
|---|---|---|---|
| 2,607,753 | 8/1952 | Adams | 260—94.7 |
| 2,846,068 | 8/1958 | Smith et al. | 209—166 |
| 2,953,556 | 9/1960 | Wolfe et al. | 260—94.7 |
| 2,979,385 | 4/1961 | Karasek et al. | 23—253 |
| 3,042,637 | 7/1962 | Crouch | 260—94.7 |

OTHER REFERENCES

Chemical Abstracts, vol. 48, No. 12, 7, 298i, June 25, 1952.

Chemical Abstracts, vol. 50, No. 22, 17, 441i, Nov. 25, 1956.

Svensk: Papperstidn 62, 646-8, 1959 (see Chemical Abstracts, 1960, p. 3945e).

Benger: Archiv Fur Hygiene und Bacteriologie, 144 Band, Heft 3, 214, 28, 1960 (see Chemical Abstracts, 1960, p. 21565b).

JOSEPH L. SCHOFER, *Primary Examiner.*

M. LIEBMAN, JAMES A. SEIDLECK, *Examiners.*